US008613780B2

(12) United States Patent
Asthana et al.

(10) Patent No.: US 8,613,780 B2
(45) Date of Patent: Dec. 24, 2013

(54) PROCESS FOR PRODUCING MIXED ESTERS OF FATTY ACIDS AS BIOFUELS

(75) Inventors: Navinchandra S. Asthana, Evansville, IN (US); Dennis J. Miller, Okemos, MI (US); Carl T. Lira, East Lansing, MI (US); Evan Bittner, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 855 days.

(21) Appl. No.: 12/313,343

(22) Filed: Nov. 19, 2008

(65) Prior Publication Data

US 2009/0126262 A1 May 21, 2009

Related U.S. Application Data

(60) Provisional application No. 61/003,790, filed on Nov. 20, 2007.

(51) Int. Cl.
*C10L 1/18* (2006.01)

(52) U.S. Cl.
USPC .......................................................... 44/388

(58) Field of Classification Search
USPC .................................... 554/174; 44/385, 388
See application file for complete search history.

(56) References Cited

U.S. PATENT DOCUMENTS

| 5,268,008 | A | 12/1993 | Kanne |
| 6,468,319 | B1 | 10/2002 | Yeh et al. |
| 6,548,681 | B1 | 4/2003 | Chopade et al. |
| 7,321,052 | B2 | 1/2008 | Miller et al. |
| 2006/0014977 | A1 | 1/2006 | Miller et al. |
| 2006/0199970 | A1* | 9/2006 | Miller et al. .................. 554/174 |
| 2007/0056213 | A1 | 3/2007 | French et al. |
| 2007/0251141 | A1* | 11/2007 | Bist et al. ........................ 44/385 |

FOREIGN PATENT DOCUMENTS

| WO | WO 2006/128881 | 7/2006 |
| WO | WO 2006/107407 | 12/2006 |
| WO | WO2006128881 | * 12/2006 |

* cited by examiner

*Primary Examiner* — Prem C Singh
*Assistant Examiner* — Chantel Graham
(74) *Attorney, Agent, or Firm* — Marshall, Gerstein & Borun LLP

(57) ABSTRACT

A process for producing mixed esters of fatty acids as biofuel or additive to a petroleum fuel for use in a compression ignition (CI) engine. The process preferably provides a partial transesterification of a mixture of fatty acid methyl esters with at least one alkyl alcohol containing 2 to 8 carbon atoms in the presence of a heterogeneous solid acid catalyst to produce a mixture of the fatty acid methyl esters and alkyl alcohol esters of the fatty acids.

33 Claims, 1 Drawing Sheet

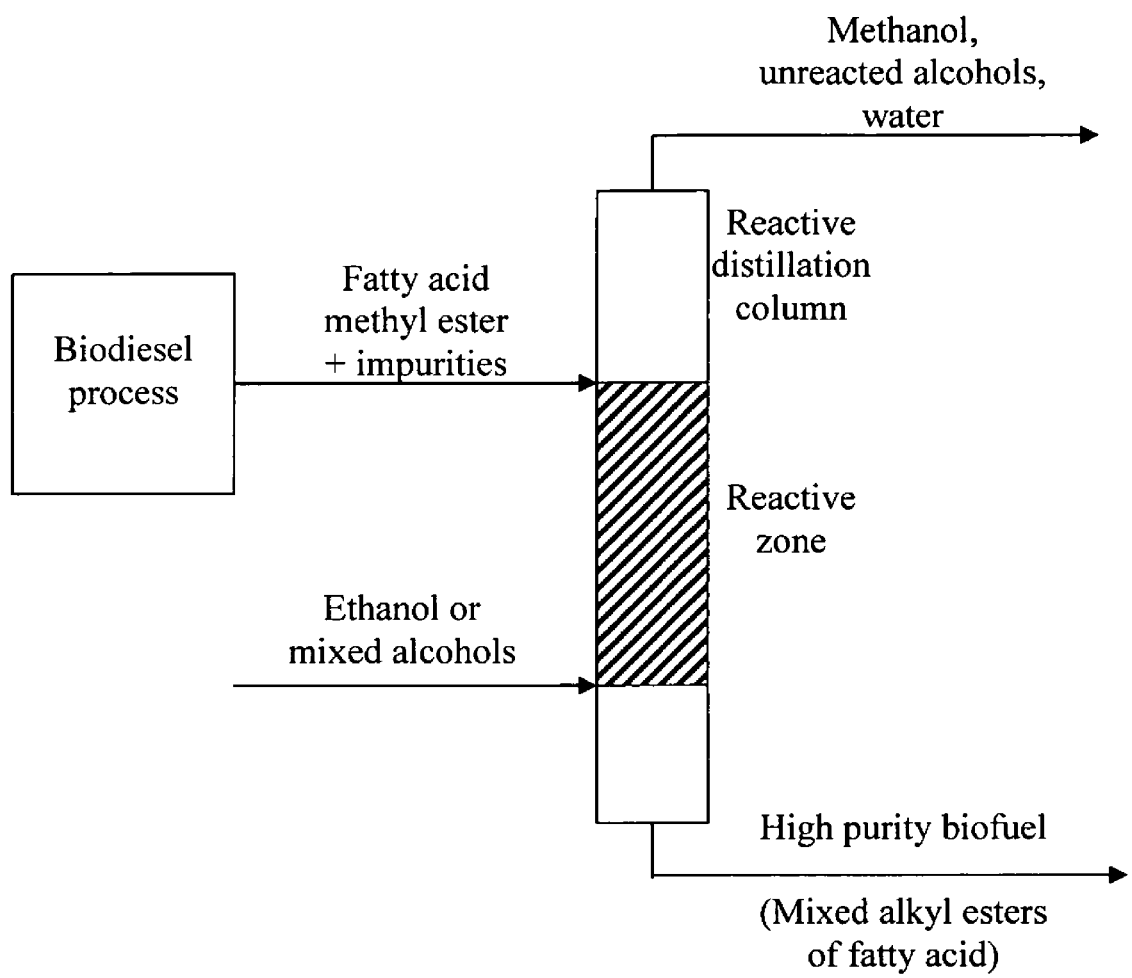

PROCESS FOR PRODUCING MIXED ESTERS OF FATTY ACIDS AS BIOFUELS

CROSS-REFERENCE TO RELATED APPLICATIONS

Priority is claimed to Provisional Application No. 61/003,790, filed Nov. 20, 2007, the entire disclosure of which is herein incorporated by reference.

STATEMENT REGARDING FEDERALLY SPONSORED RESEARCH OR DEVELOPMENT

This invention was made with government support from the United States Department of Agriculture under grant No. 2006-35504-17364. The government has certain rights in the invention.

BACKGROUND OF THE INVENTION (1) Field of the Invention

The present invention relates generally to a process producing mixed esters of fatty acids as biofuels particularly for use in a compression ignition (CI) (particularly diesel) engine.

(2) Description of Related Art

Biodiesel has been considered as an alternative to petroleum based diesel for many years. Biodiesel is a general term referring to a fuel comprising methyl-esters of long chain fatty acids derived typically from vegetable oils or animal fats. It can be used per se as fuel, or as an additive in a blend with petroleum-based diesel fuel.

The biodiesel industry in the U.S. currently suffers from a lack of consumer confidence in the quality of the biofuel. The uncertainty in fuel quality stems from lack of experience on the part of producers in being consistent in their production methods, and the all-too-often absence of careful fuel analysis to ensure that quality standards such as ASTM specifications are achieved. Although several measures of biodiesel quality can be used, the limiting factor is often the cold-weather performance properties of biodiesel, manifested as a cloud point and pour point temperature that is too high for the climate. A high cloud point temperature in biodiesel is typically observed because of (1) glyceride impurities present and (2) the presence of only methyl esters of unsaturated and saturated fatty acids. If residual glyceride impurities are not removed from the finished product, the biodiesel forms crystals at low temperature and those crystals plug fuel filters and injectors. Even if the impurities are removed, the saturated fatty acid methyl esters crystallize at some point as temperature is reduced, thus leading to solids formation. Thus, auto and diesel engine manufacturers at present will only warrant biofuel compositions up to a biofuel content of B5 (5% biodiesel/95% petroleum). Ideally, a high quality biofuel for the North American climate would contain at least B20 (20% biodiesel, 80% petroleum).

Biodiesel offers several advantages. In particular, when compared to petroleum diesel, biodiesel provides similar fuel economy, horsepower and torque while providing superior lubricity. Moreover, biodiesel provides a substantial reduction of emission of unburned hydrocarbons, carbon monoxide, and particulate matter. Typically, it is free of sulfur and aromatics which are major pollutants. Accordingly, biodiesel is considered a renewable, non-toxic and biodegradable fuel alternative or additive.

Previous methods associated with producing mixed esters of fatty acids include reaction of (1) a mixture of different triglycerides with methanol; or (2) an oil (triglycerides) with a mixture of different alcohols, namely ethanol, methanol, n-butanol and n-propanol, in the presence of a base catalyst chosen from sodium hydroxide, potassium hydroxide and sodium methylate. In presence of a base catalyst (sodium or potassium hydroxides), the rate and extent of ester formation are directly proportional to the formation of sodium or potassium alkoxide from the alcohol in situ in the reaction mixture.

Upon completion of the reaction, ideally two distinct phases, 1) glycerol (a trihydroxy alcohol) and 2) esters of fatty acids, are observed. The following limitations are typically associated with this process: 1) the transesterification reaction proceeds smoothly only when methanol is used as an alcohol and fatty acid methyl ester (FAME) is synthesized, and the reaction is adversely affected when higher alcohols such as ethanol, n-propanol and n-butanol are used; 2) use of higher alcohols also creates a problem of readily separating glycerol from the alkyl esters of fatty acids, which requires additional processing steps including alcohol separation from the reaction mixture and dilute acid wash to facilitate glycerol phase separation from fatty acid ester; and 3) use of base catalyst increases the prospect of soap formation (saponification of the fatty acids) which is quite detrimental to overall process and its economy. It is a further disadvantage of existing processes that the base catalysts used in the reaction system are not re-usable, thereby generating a considerably significant quantity of salt waste.

U.S. Patent Application No. 2007/0056213 to French et al. describes a method which includes operating a two-stroke engine with a lubricating fuel. A fuel/lubricant formulation is disclosed for the operation of the two-stroke engines with improved emissions and performance. The lubricating fuel includes at least one fuel selected from the group including C1-6 alcohol, gasoline, ether, ketone, nitromethane, and a mixture thereof, and at least one lubricant selected from the group including biodiesel, lipid fatty acid alkyl ester, fatty acid and a mixture thereof. Diesel fuels are not described.

Patent application WO 2006/107407 to Clements describes processes and systems for producing biodiesel or fatty acid esters from multiple triglyceride feedstocks using a two step reaction with an alcohol and acid catalyst and then an alkaline catalyst. The first step forms an acid alcohol layer and an ester-triglyceride layer. The second step reacts the ester triglyceride layer with a base to form the fatty acid esters.

Patent application WO 2006/128881 to Despeghel describes alkyl-ester compositions derived from rapeseed and sunflower, in particular from *Brassica napus* and *Helianthus annuus* using an acid catalyst in a batch process. Despeghel further discloses a process for preparation of the alkyl-esters. The alkyl-ester compositions can be used in diesel engines in its pure form or blended with another composition such as fuel.

U.S. Pat. No. 6,468,319 to Yeh et al. describes various esters used in diesel fuel to reduce emissions. U.S. Pat. No. 5,268,008 to Kanne describes esters used in diesel fuels to reduce emissions.

While the related art teach processes for generating biodiesel, there still exists a need for improved processes and compositions for generating biodiesel.

OBJECTS

Therefore, it is an object of the present invention to provide a biodiesel composition and an improved process for generating the composition. The process produces an improved biofuel which comprises in part or in whole mixed alkyl esters of fatty acids. The invention provides a process that can be added to current biodiesel production facilities, with the goal of removing impurities from the biodiesel stream and at the same time producing a mixed alkyl ester fuel with superior properties.

These and other objects of the present invention will become increasingly apparent with reference to the following drawing and preferred embodiments.

SUMMARY OF THE INVENTION

The present invention provides a continuous process for producing a fatty acid alkyl ester mixture which comprises: (a) countercurrently reacting a fatty acid methyl ester at a temperature between about 50 and 200° C. and a pressure between about 0.5 and 20 atmospheres with at least one alkyl alcohol having 2 to 8 carbon atoms in the presence of a solid acid catalyst in a reactive zone in a distillation column to produce a fatty acid alkyl ester mixture; and (b) recovering the produced fatty acid alkyl ester mixture at the bottom of the column and the alcohol from the top of the column. In further embodiments, the solid acid catalyst is a heterogeneous acid catalyst. In further still embodiments, the reactive distillation column comprises: (a) the reactive zone containing the solid acid catalyst; (b) a fatty acid ester inlet above the catalyst; (c) an alcohol inlet below the catalyst; (d) product outlet at the bottom of the column for separating the produced fatty acid alkyl ester; and (e) an outlet at the top of the column for methanol formed in the reaction and at least one alcohol which is unreacted. In still further embodiments, the solid catalyst is a heterogeneous solid acid catalyst. In further still embodiments, the fatty acid methyl ester comprises a mixture of fatty acid methyl esters and methanol, monoglyceride, diglyceride, triglyceride, and glycerol as impurities. In further still embodiments, the present disclosure provides for a process wherein at least the monoglyceride, diglyceride and triglyceride of the impurities are transesterified in the reaction with the alkyl alcohol having 2 to 8 carbon atoms producing mixed fatty acid alkyl esters to be separated at the bottom of the column, along with glycerol. The glycerol leaving the column at the bottom can be at least partially removed by a process selected from the group consisting of phase separation, water washing, and application of an adsorbent.

In an exemplary embodiment, the fatty acid methyl ester is generated from a preliminary transesterification reaction of a vegetable oil as a triglyceride with methanol. In further still embodiments, the preliminary transesterification reaction of a vegetable oil as a triglyceride with methanol takes place in a biodiesel production plant and the reactive distillation column is added onto the biodiesel production plant to receive the fatty acid methyl ester product stream. In further still embodiments, the fatty acid alkyl ester produced is in admixture with the fatty acid methyl ester. In still further embodiments, the alkyl alcohol is ethanol and the fatty acid alkyl ester is a fatty acid ethyl ester. In further still embodiments, the alkyl alcohol is a mixture of alcohols having 2 to 8 carbon atoms. In still further embodiments, the alkyl alcohol mixture contains ethanol and butanol and the fatty acid alkyl ester produced comprises a mixture of a fatty acid ethyl ester and a fatty acid butyl ester. In further still embodiments, the alkyl alcohol is selected from the group consisting of ethanol, propanol, isopropanol, butanol, isobutanol, amyl and iso-amyl alcohol and mixtures thereof. In still further embodiments, the produced fatty acid alkyl ester has a cloud point lower in temperature than the methyl fatty acid ester. In further still embodiments, the produced fatty acid alkyl ester is in addition blended with a petroleum diesel fuel. In still further embodiments, the petroleum diesel fuel is 50 to 95% of the blend. In still further embodiments, the fatty acid methyl ester is selected from the group consisting of methyl palmitate, methyl stearate, methyl oleate, methyl linoleate, methyl linolenate, and mixtures thereof. In further still embodiments, the produced fatty acid alkyl ester is derived from the group of acids selected from the group consisting of stearic acid, oleic acid, linoleic acid, linolenic acid, and mixtures thereof.

The present invention further provides a process for preparing a fatty acid ester mixture, useful alone or in combination with petroleum fuel, in a compression ignition engine, which comprises: (a) reacting an impure fatty acid methyl ester mixture with at least one alkyl alcohol containing 2 to 8 carbon atoms in the presence of a base or acid wherein, the impure fatty acid methyl ester mixture comprises fatty acid methyl ester and methanol, one or more of a monoglyceride, a diglyceride, and a triglyceride as impurities; wherein the reaction partially transesterifies the impure methyl ester mixture to produce a mixture of fatty acid alkyl esters containing 1 to 8 carbon atoms; and (b) removing methanol formed in the reaction and unreacted alkyl alcohol to produce the fatty acid ester mixture. In an exemplary embodiment, the alcohol is ethanol. In further still embodiments, at least one alcohol is ethanol and at least one of the produced alkyl fatty acid esters is a fatty acid ethyl ester. In still further embodiments, the impure mixture is reacted with a mixture of two or more alcohols at least one of which is ethanol. In further still embodiments, the mixture of alcohols comprises ethanol and butanol and the reaction with the impure fatty acid methyl ester mixture further produces a fatty acid ethyl ester and a fatty acid butyl ester.

The present invention provides for an exemplary process for producing mixed esters of fatty acids, which comprises: (a) partially transesterifying at a temperature between about 50 and 200° C. and a pressure between about 0.5 and 20 atmospheres, a mixture of fatty acid methyl esters with at least one alkyl alcohol containing 2 to 8 carbon atoms in the presence of a heterogeneous solid acid catalyst to produce a mixture of the fatty acid methyl esters and alkyl alcohol derived fatty acid esters; and (b) separating the esters from the catalyst. In further embodiments, the mixture of fatty acid methyl esters comprises of methyl palmitate, methyl stearate, methyl oleate, methyl linoleate and methyl linolenate. In still further embodiments, the alkyl alcohol is selected from the group consisting of ethanol, n-propanol, n-butanol, iso-amyl alcohol and mixtures thereof.

The present invention provides for a composition useful in a compression ignition (CI) engine which comprises a mixture of fatty acid methyl esters and of fatty acid alkyl esters of at least one alkyl alcohol containing 2 to 8 carbon atoms, wherein the cloud point of the mixture is lower in temperature than that of the mixture of the fatty acid methyl esters alone. In further embodiments, the mixture of fatty acid methyl esters comprises esters of palmitic acid, stearic acid, oleic acid, linoleic acid and linolenic acid from soybean.

The present invention provides for a composition adapted for use in a compression ignition (CI) engine, comprising a mixture of fatty acid methyl esters, fatty acid alkyl esters of at least one alkyl alcohol containing 2 to 8 carbon atoms, esters of a fermentation or non-fermentation derived organic acid with at least one alkyl alcohol containing 1 to 6 carbon atoms and optionally an ether containing at least 6 carbon atoms as an oxygenate. In further embodiments, a cloud point of the mixture is at a lower in temperature than that of the fatty acid methyl esters alone. In further still embodiments, the mixture of fatty acid methyl esters comprises methyl palmitate, methyl stearate, methyl oleate, methyl linoleate and methyl linolenate. In still further embodiments, the alkyl alcohol is selected from the group consisting of ethanol, propanol, butanol, iso-amyl alcohol and mixtures thereof. In further still embodiments, the mixture of fatty acid methyl and alkyl esters comprises esters of palmitic acid, stearic acid, oleic acid, linoleic acid, dimethyl succinate and linolenic acid. In still further embodiments, the fermentation or non-fermentation derived organic acid ester is derived from an acid selected from the group consisting of lactic acid, succinic acid and mixtures thereof. In still further embodiments the fermentation or non-fermentation derived organic acid ester is derived from an acid selected from the group consisting of propionic acid, butyric acid, isobutyric acid, dicarboxylic and carboxylic acids, and mixtures thereof. In still further embodiments, the ether is selected from the group consisting of dibutyl ether (DBE); methyl tert-butyl ether (MTBE); tertiary amyl methyl ether (TAME); tertiary hexyl methyl ether (THEME); ethyl tertiary butyl ether (ETBE); tertiary amyl ethyl ether (TAEE); propyl ether (DIPE); dipropyl ether; dihexyl ether; dioctyl ether, and iso-amyl-ether. In further still embodiments, the oxygenate is an ester.

An exemplary embodiment associated with the present invention provides for a biofuel, for use in compression ignition (CI) engines, comprising mixtures of fatty acid methyl esters, fatty acid esters of at least one alcohol containing 2 to 8 carbon atoms, esters of a fermentation derived organic acid with at least one alcohol containing 1 to 6 carbon atoms and optionally an ether containing at least 6 carbon atoms as an oxygenate. In an exemplary embodiment, the fermentation derived organic acid can be derived from a carbohydrate (such as sugar) fermentation source. The cloud point of the mixture can be lower in temperature than that of the fatty acid methyl esters alone (conventionally known as biodiesel and currently used in CI engines). Typically, the mixture of fatty acid methyl esters contains methyl palmitate, methyl stearate, methyl oleate, methyl linoleate and methyl linolenate. The alcohol can be selected from the group consisting of ethanol, propanol, butanol, iso-amyl alcohol and mixtures thereof. The mixed fatty acid esters are methyl and higher alcohol esters of palmitic acid, stearic acid, oleic acid, linoleic acid and linolenic acid. The fermentation derived organic acid can be selected from the group consisting of lactic acid, succinic acid and mixtures thereof. In a further exemplary embodiment, the organic acid can be selected from the group consisting of propionic acid, butyric acid, isobutyric acid, mixed carboxylic acids and mixtures thereof. These can be used as additional fuel additives. In an exemplary embodiment, the ether is dibutyl ether (DBE).

BRIEF DESCRIPTION OF THE DRAWINGS

FIG. 1 is a diagram illustrating the continuous process of the present invention.

DESCRIPTION OF PREFERRED EMBODIMENTS

All patents, patent applications, government publications, government regulations, and literature references cited in this specification are hereby incorporated herein by reference in their entirety. In case of conflict, the present description, including definitions, will control.

The present invention relates to (1) the preparation of mixed esters of fatty acids and (2) mixtures of fatty acid methyl esters and diethyl succinate/ ethyl lactate (a succinic acid ester/lactic acid ester), to be used as fuel in diesel engines. In an exemplary embodiment, mixed esters of fatty acids and blended FAME, a commercially available impure fatty acid methyl ester, have cloud points 5-10° C. lower than FAME (defined as Biodiesel by National Biodiesel Board). The lower cloud points of these mixed esters can make them more suitable than current biodiesel for use as a diesel fuel, particularly without the use of chemical additives. It is a further aspect of the present invention that the exemplary mixed ester compositions can be blended in higher concentrations into petroleum diesel than standard FAME.

It should be understood by those having skill in the art that a fatty acid is generally described as a carboxylic acid having an aliphatic tail (chain), either saturated or unsaturated and typically unbranched. Carboxylic acids as short as butyric acid (4 carbon atoms) are considered to be fatty acids. Fatty acids derived from natural fats and oils usually have at least 8 carbon atoms, e.g. caprylic acid (octanoic acid).

Most natural fatty acids have an even number of carbon atoms, because their biosynthesis involves acetyl-CoA, a coenzyme carrying a two-carbon-atom group. Fatty acids are typically produced by the hydrolysis of the ester linkages in a fat or biological oil (both of which are triglycerides), with the production of glycerol. FAME (Fatty Acid Methyl Ester) is generally characterized by the chemical formula, $ROOCH_3$, wherein R is a fatty acid carbon chain.

As used herein, the term "higher alkyl alcohols (ROH)" refers to alcohols having 2 to 8 carbon atoms (e.g., as compared to methanol). As used herein, a lower alkyl alcohol is an alcohol with only one carbon such as methanol, but can be ethanol, propanol, or butanol if reacted with a higher alkyl ester, wherein the alkyl has more carbons than the alcohol (i.e., carbons of alkyl are greater than carbons of alcohol). However, it is understood that the terms "lower" and "higher" are relative terms based on the carbon atoms of the alcohol and the alkyl group of the reacting ester. For example, ethanol is a higher alkyl alcohol when reacted with a lower-methyl-ester. In another example, butanol is a higher alkyl alcohol when reacted with a lower-ethyl-ester.

Exemplary mixed esters according to the present invention are synthesized using a transesterification process. The term "transesterification" refers to a process of exchanging the lower alkyl group of an ester compound with a higher alkyl group or vice versa. These reactions are often catalyzed by the addition of an acid or base.

EXAMPLE

Higher alkyl Alcohol+lower alkyl ester→lower alcohol+ higher alkyl ester

Solid acid catalysts donate a proton to the carbonyl group, thus making it more reactive.

The transesterification reactions associated in the Examples below were carried out using several exemplary catalysts including but not limited to: sodium ethylate (base), Amberlyst-15 (Bronsted acid), Amberlyst-70 (acid), SBA-15/titanium diisoprpyl bis(acac)$_2$, SBA-15 (acid), SBA-15/dibutyltin bis(acac)$_2$ (acid), SBA-15/aminopropyltrimethoxysilnae-titanium tetrachloride (Lewis acid), SBA-15/ruthenium(acac)$_2$, and sulfated zirconia (acid) catalysts. The sodium ethylate (NaOC2H5—also known as sodium ethoxide) is a base that operates as a catalyst. Generally, the base catalyst is not consumed in the reaction unless free fatty acid is present. It is desirable to avoid the presence of free fatty acid. Preferably the reaction mixture is substantially free of free fatty acids. The presence of free fatty acids with the sodium ethylate base catalyst forms a salt of the free acid. This process is saponification and results in the formation of soap. In an exemplary embodiment, the reaction mixture contains less than 1.0%-wt of free fatty acid, more preferably less than 0.1%-wt of free fatty acid, and even more preferably less than 0.01%-wt of free fatty acid. The term "acac" associated with the catalysts in Experiment Nos. 8, 9, and 11 in Table 1 below refers to "acetyl acetate", a common organic ligand used to make homogeneous complexes of transition metals that are soluble in water. SBA-15 is a mesoporous silica-alumina solid acid that serves as a catalyst support for other oxide catalysts or as a catalyst itself. It is related to zeolites in its composition and acidity. It is a common material known in the art. Amberlyst 15 and Amberlyst 70 are strong cationic exchange resins. Typically, Amberlyst 70 can tolerate higher temperatures (150° C. vs. 120° C. for Amberlyst 15), but at a cost of approximately ⅔ of the active (acid) site concentration per unit mass. Sulfated zirconia is $ZrO_2$ that has been treated with sulfuric acid to produce $—SO_3$ groups on the surface. These are highly acid groups that give sulfated zirconia its high catalyst activity. Typically, the catalysts that are placed onto the SBA-15 support are organometallic complexes of varying composition that are known to be active acid catalysts. In an exemplary embodiment, FAME was used as the starting substrate for reactions along with various alcohols. Exemplary alcohols include but are not limited to: ethanol, n-butanol, n-propanol and i-propanol among others.

In exemplary laboratory batch transesterification reactions, FAME was mixed with at least one of the alcohols. FAME was also used in a mixture of two or three alcohols and one of the catalysts, mentioned hereinabove. In an exemplary embodiment, FAME was a mixture of methyl palmitate, methyl stearate, methyl oleate, methyl linoleate and methyl linolenate. The compositions are shown as percent by weight:

Methyl oleate: 25.9

Methyl linoleate: 46.1

Methyl linolenate: 13.3

Methyl palmitate: 5.4

Methyl stearate: 4.4

Monoglycerides: 3.24

Unknown: 1.66

For the monoglycerides, three different peaks were observed. The value reported for monoglycerides was a combination of these three peaks. This is typical of a soy or canola oil composition. In an exemplary embodiment, unreacted alcohols from each reaction mixture were removed by vacuum distillation and the final mixture, containing only esters, was evaluated to determine the cloud point. The results for various transesterification reactions involving FAME as one of the reactants are reported with respect to Table 1. The cloud point results for various ester mixtures are provided in Table 2.

TABLE 1

Preliminary results for various transesterification reactions

| Exp. No. | Alcohol | MR | Catalyst | Temp. (° C.) | Reaction Time | % Average Conv* |
|---|---|---|---|---|---|---|
| 1 | Ethanol | 6 | Amberlyst-15 | 78 | 24 h | 59 |
| 2 | i-Propanol | 6 | Amberlyst-15 | 80 | 24 h | 72 |
| 3 | n-Propanol | 6 | Amberlyst-15 | 98 | 24 h | 75 |
| 4 | n-Butanol | 6 | Amberlyst-70 | 110 | 24 h | 49 |
| 5 | Ethanol | 6 | Sulfated zirconia | 120 | 24 h | 32 |
| 6 | Ethanol | 6 | Amberlyst-15 | 120 | 24 h | 65 |
| 7 | Ethanol | 6 | No catalyst | 120 | 24 h | 5 |
| 8 | Ethanol | 6 | SBA-15/Ti(acac)$_2$(IPA)$_2$ | 120 | 24 h | 22 |
| 9 | Ethanol | 6 | SBA-15/(butyl)$_2$Sn(acac)$_2$ | 120 | 24 h | 44 |
| 10 | Ethanol | 6 | SBA-15 | 120 | 24 h | 7 |
| 11 | Ethanol | 6 | SBA-15/Ru(acac)$_2$ | 120 | 24 h | 12 |
| 12 | Ethanol | 6 | SBA-15/AMPTS-TiCl$_4$ | 120 | 24 h | 15 |
| 13 | Ethanol | 6 | NaOC$_2$H$_5$ in EtOH (21 wt %) | 78 | 6 h | 80 |
| 14 | Ethanol | 6 | NaOC$_2$H$_5$ | 78 | 16 h | 55 |

*The average of 5 major methyl-esters of FAME reacted by transesterification reaction in a stirred batch vessel. Experiment Nos. 1-4, 13, and 14 were performed at a pressure of 1 atm. Experiment Nos. 5-12 were performed at 120° C. and 60 psia, the vapor pressure of ethanol at that temperature.

TABLE 2

Cloud point for mixed esters

| Mixtures | Volume Ratio | Cloud point (° C.) |
|---|---|---|
| FAME | 100:0 | 2 |
| FAME + Ethyl lactate | 90:10 | −1 |
| FAME + Ethyl lactate | 70:30 | −3 |
| FAME + Diethyl succinate | 90:10 | −4 |
| FAME + Diethyl succinate | 70:30 | −4 |
| FAME + FAEE[a] | 34:66 | −5 |
| FAME + FAIE[b] | 27:73 | −5 |
| FAME + DBS[c] | 90:10 | −1 |
| FAME + DBS | 70:30 | −3 |
| FAME + FABE[d] | 6:94 | −4 |
| FAME + FABE + DBS | 5:85:10 | −5 |
| FAME + FABE + DBS | 4:66:30 | −7 |
| FAME + FABE + DBS | 3:47:50 | −8 |
| FAME + FABE + DBS + DBE[e] | 5:85:5:5 | −4 |
| FAME + FABE + DBS + DBE | 4:66:20:10 | −6 |
| FAME + FABE + DBS + DBE | 3:47:20:30 | −11 |
| FAME + FABE + DBS + DBE | 3:47:30:20 | −12 |
| FAME + FABE + DBS + DBE | 3:47:40:10 | −12 |

[a]Fatty acid ethyl esters
[b]Fatty acid iso-propyl esters
[c]Dibutyl succinate
[d]Fatty acid n-butyl ester
[e]Dibutyl ether Cloud point analysis, as in Table 2, of mixed alkyl esters of fatty acids can range from about 5-14° C. (9-25° F.) lower than methyl esters of fatty acids. Therefore, in an exemplary embodiment these mixed esters can be used as diesel-fuel in not-so-harsh winter conditions with few if not any further additives. Since FAME is used as a substrate, the ratio of each alkyl ester in the final mixture can be controlled by the extent of conversion of methyl esters to respective alkyl ester or by blending the pure FAME with other pure alkyl esters in various proportions as per the requirements.

In the exemplary process associated with the present invention, FAME was used as a substrate to synthesize fatty acids ester of higher alcohol and solid acid catalysts instead of base catalysts. Some of the advantages associated with these particular exemplary processes include but are not limited to:

1) Use of solid acid catalysts eliminates the problems associated with base catalysts; and
2) The use of solid acid catalysts allows the processes to be carried out on a continuous basis as opposed to only batch processes, typical with base catalysts.

In an exemplary embodiment, the temperature at which the reaction takes place with the acid catalysts is from about 50 to 200° C. and the pressure can range from about 0.5 to 20 atmospheres. Operating conditions are largely dependent upon the chosen catalyst. For example, ion exchange resins are typically best up to 150° C.

Fatty acid esters of other higher alcohols with 100% conversion and 100% purity using FAME as a substrate are produced on a continuous-scale by reactive distillation.

In a further aspect of the present invention the process of synthesizing higher alkyl fatty acid esters from FAME via transesterification with higher alcohols with solid acid catalysts, was also a suitable method for converting residual triglycerides (along with FAME in biodiesel) to alkyl esters of fatty acids. This helps in maintaining the total glycerin concentration in the biodiesel at a permissible level as per American Society for Testing and Materials (ASTM) standard.

Thus, the present invention provides a process step in biodiesel production that removes undesired impurities and provides a mixed ester that inhibits crystal formation at lower temperature, thus effectively eliminating the challenges associated with fuel properties such as cloud point and therefore producing a consistent, reliable diesel fuel substitute.

The process is shown in FIG. 1. The product stream from a conventional biodiesel production facility contains primarily fatty acid methyl esters (FAME) but contains small quantities of impurities such as triglycerides (TG), diglycerides (DG), monoglycerides (MG), glycerol (GO), methanol, water, and transesterification catalyst. In conventional biodiesel production, these impurities are removed (often incompletely) by a combination of water washing and addition of solid absorbents. Both methods lead to questionable results and generation of waste.

As shown in FIG. 1, in an exemplary process associated with the present disclosure, a reactive distillation column is provided as an add-on to existing biodiesel production plants to facilitate purification of traditional biodiesel production. The FAME+impurities stream is further transesterified with ethanol, higher alcohols (C2 or higher) and/or a mixture thereof, in the reactive distillation column. This process further transesterifies the FAME and the Fatty Acid impurities thereby forming desired product to be collected at the bottom of the column. The High Purity biofuels contains mixed alkyl esters of fatty acids. The impurities are essentially removed. In a further exemplary embodiment, any glycerol present in the initial impure FAME stream coming from the biodiesel process and feeding into the reactive column is removed. Glycerol will leave the column at the bottom along with the high purity mixed alkyl ester product stream. Several techniques can be employed to essentially remove the glycerol including but not limited to: a phase separation, washing the biodiesel with water, or by using an adsorbent to remove glycerol. U.S. Pat. No. 7,321,052 to Miller et al., the description of which is incorporated by reference in its entirety herein, describes a process for producing a glycerol acetal useful in fuels. U.S. Pat. No. 6,548,681 to Chopade et al, the description of which is incorporated by reference in its entirety herein, describes the function and separation of polyol acetals, including glycerol.

In the process diagram shown in FIG. 1, the biodiesel product stream is fed to a reactive distillation column that constitutes an important aspect of the present invention. The reactive distillation column consists of a vertical vessel containing a solid structural packing or a dumped packing in which a catalyst material is held. The section of the column containing the acid catalyst material is referred to as the reactive zone. In an exemplary embodiment, the reaction zone comprises the catalyst mounted in structured packing elements and supported as a single unit of the structured packing elements. Liquid moves downward in the column and vapors, generated via a reboiler at the base of the column, move upward. In the reactive distillation column, the biodiesel stream is fed near the top of the reactive zone and flows downward over the catalyst. An alcohol such as ethanol or a mixture of alcohols such as ethanol and butanol is added to the column near the bottom of the reactive zone and flows upward as vapor over the catalyst. In the catalyst zone, several reactions take place. First, the unreacted mono-, di- and triglycerides (MG,DG,TG) are transesterified with the alcohols to produce additional alkyl esters of fatty acids and residual glycerol. This effectively removes these impurities from the fuel stream. Second, a part of the fatty acid methyl esters are transesterified to ethyl esters or mixtures such as ethyl+butyl esters. This happens because there is free alcohol in the column and because any methanol liberated in transesterification enters the vapor phase and exits the top of the distillation column. Third, depending on column temperature some glycerol can undergo etherification with the alcohols present to form glycerol ethers, which themselves are recognized fuel components.

If all reactions take place appropriately, the product from the bottom of the distillation column will be a small quantity of glycerol and high purity mixed alcohol ester of fatty acids. This mixture constitutes a biofuel with improved properties relative to FAME from conventional biodiesel production. The biofuel leaving the bottom of the column can be washed or treated with absorbent to ensure purity to remove the residual glycerol, but most often that will not be necessary. More likely, a simple phase separation step to remove any unreacted residual glycerol will be carried out and then the fuel can be sent to storage for use. The stream from the top of the column consists of unreacted ethanol or mixed alcohol feed, methanol liberated in transesterification or stripped from the biodiesel. If the biodiesel contains water, then water also leaves through the top of the column. Water is not per se generated in the transesterification reaction. However, water can be formed in biodiesel production if there are free fatty acids in the starting triglyceride feedstock. Thus, water may be formed (via etherification or esterification of free fatty acids) and is subsequently removed through the top of the column with methanol and any other residual alcohols. These alcohols can be recovered by distillation and recycled into the process. The reaction kinetics are favorable for the formation of the higher fatty acid esters, as seen in Table 3.

TABLE 3

Rate constants for formation of ethyl, butyl and isoamyl esters of fatty acids by transesterification of methyl esters of fatty acids at various temperatures

| Temp (°C.) | Rate constants; k ($Kg_{sol}^2 \cdot mol^{-1} \cdot Kg_{cat}^{-1} \cdot s^{-1}$) | | |
|---|---|---|---|
| | Ethyl oleate | Butyl oleate | Isoamyl oleate |
| 80 | $1.5 \times 10^{-5}$ | | |
| 100 | $3 \times 10^{-5}$ | $4 \times 10^{-5}$ | $4 \times 10^{-5}$ |
| 120 | $14 \times 10^{-5}$ | $9 \times 10^{-5}$ | $11 \times 10^{-5}$ |
| | Ethyl linoleate | Butyl linoleate | Isoamyl linoleate |
| 80 | $1.5 \times 10^{-5}$ | | |
| 100 | $3 \times 10^{-5}$ | $4 \times 10^{-5}$ | $4 \times 10^{-5}$ |
| 120 | $14 \times 10^{-5}$ | $9 \times 10^{-5}$ | $11 \times 10^{-5}$ |
| | Ethyl linolenate | Butyl linolenate | Isoamyl linolenate |
| 80 | $2.5 \times 10^{-5}$ | | |
| 100 | $4.5 \times 10^{-5}$ | $6 \times 10^{-5}$ | $5.5 \times 10^{-5}$ |
| 120 | $21.5 \times 10^{-5}$ | $12.5 \times 10^{-5}$ | $14.5 \times 10^{-5}$ |

These rate constants are for the transesterification of methyl esters to ethyl, butyl, or isoamyl esters as per the following reaction: Fatty acid methyl ester+alcohol (e.g. ethanol)=Fatty acid alkyl (ethyl) ester+methanol The catalyst for these reactions is Amberlyst 15 cation exchange resin. These results show that it is kinetically practical to carry out transesterification of methyl esters to other esters using ion exchange resins.

A set of experiments were conducted to characterize the equilibrium constant for the transesterification of methyl esters (e.g. biodiesel) to butyl or ethyl esters. The reactions were carried out in stirred vessels in a laboratory, analogous to a single equilibrium stage in a reactive distillation column, for reaction times ranging from 2 hr to 8 days. Reactions were considered to be at equilibrium when the composition was unchanged over several sample collections. Table 4 shows the results of the experiments using butanol and ethanol to make butyl esters and ethyl esters of fatty acids. The data given in Table 4 show that a single stage in a reactive distillation column can achieve conversions of methyl ester to butyl ester of approximately 85%. Accordingly, reactive distillation can be an effective and efficient method to carry out the desired reactions. By changing the ratio of alcohol to fatty acid methyl ester, mixed esters of any desired composition via reactive distillation can be produced. These mixed esters are useful as advanced biofuel components.

The invention constitutes a low-cost, efficient approach to producing a high-quality biofuel that meets fuel standards and has improved fuel properties. The present invention provides for a process for producing mixed esters of fatty acids as biofuel for use in compression ignition (CI) engine, which comprises: (a) partial transesterification of a mixture of fatty acid methyl esters with at least one higher alcohol containing 2 to 8 carbon atoms in the presence of a heterogeneous solid acid catalyst to produce a mixture of the fatty acid methyl esters and higher alcohol esters of the fatty acids; and (b) separating the catalyst from the transesterified reaction mixture. Separation of the alcohol esters of the fatty acids and the FAME can be accomplished using traditional separation techniques such as distillation and/or evaporation. The present invention further provides for a biofuel composition for use in compression ignition (CI) engine which comprises a mixture of fatty acid methyl esters and of fatty acid esters of at least one alcohol containing 2 to 8 carbon atoms. The cloud point of the mixture is lower in temperature than that of the fatty acid methyl esters alone.

In an exemplary embodiment, the present invention provides for a biofuel, for use in compression ignition (CI) engines, comprising mixtures of fatty acid methyl esters, fatty acid esters of at least one alcohol containing 2 to 8 carbon atoms, esters of a fermentation derived organic acid with at least one alcohol containing 1 to 6 carbon atoms and optionally an ether containing at least 6 carbon atoms as an oxygenate. In an exemplary embodiment, the fermentation derived organic acid can be derived from a carbohydrate (such as sugar) fermentation source. Oxygenated substances are typically described as those that have incorporated oxygen in the molecule. The term "Oxygenates" typically refers to fuels or additives containing oxygen. Oxygenates are usually employed as additives to reduce carbon monoxide and carbon particulates that are created during the burning of the fuel.

Oxygenates may be based on alcohols or ethers. Some exemplary oxygenates in use include but are not limited to:
1) Alcohols: Methanol (MeOH); Ethanol (EtOH); Isopropyl alcohol (IPA); n-butanol (BuOH); t-butanol; and
2) Ethers: Methyl tert-butyl ether (MTBE); Tertiary amyl methyl ether (TAME); Tertiary hexyl methyl ether (THEME); Ethyl tertiary butyl ether (ETBE); Tertiary amyl ethyl ether (TAEE); propyl ether (DIPE); Dipropyl ether; Dihexyl ether; Dioctyl ether, iso-amyl-ether.

Further exemplary oxygenate related compositions are described in U.S. Pat. No. 6,468,319 issued to Yeh et al., the subject matter of which is incorporated by reference in its entirety herein. Yeh et al. describes diesel fuel containing

TABLE 4

Experimental results to measure transesterification equilibrium constants. (Conditions: alcohol with fatty acid methyl esters (FAMES) in 3:1 alcohol:FAME molar ratio; 25 g FAMES in 75 ml Parr reactor, stir rate 1050 RPM.)

| Exp No. | Alcohol | Reaction Temp (°C.) | Catalyst | Catalyst Quantity (wt % FAME) | Equilibrium Conversion | $K_{eq}$ |
|---|---|---|---|---|---|---|
| 1 | n-Butanol | 100.000 | Sulfuric acid | 0.101 | 83.753 | 2.359 |
| 2 | n-Butanol | 100.000 | Sulfuric acid | 0.193 | 86.713 | 2.642 |
| 3 | n-Butanol | 100.000 | Sulfuric acid | 0.250 | 86.794 | 2.669 |
| 4 | n-Butanol | 120.000 | Sulfuric acid | 0.168 | 82.421 | 2.435 |
| 5 | n-Butanol | 130.000 | Sulfuric acid | 0.149 | 87.330 | 2.499 |
| 6 | Ethanol | 100.000 | Amberlyst 15 | 5.000 | 83.190 | 1.965 | ester compositions effective in reducing emissions. U.S. Pat. No. 5,268,008 issued to Kanne describes hydrocarbon fuel compositions containing orthoesters to reduce particulate emissions therefrom when combusted in an internal combustion engine. Accordingly, the description set forth in Kanne is incorporated by reference in its entirety herein. The description of commonly owned U.S. application, 2006/0014977, filed Jul. 19, 2004 is incorporated by reference herein in its entirety.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A process for preparing a fatty acid ester mixture, the process comprising:
    (a) reacting an impure fatty acid methyl ester mixture with at least one alkyl alcohol containing 2 to 8 carbon atoms in the presence of a base or acid, wherein:
        (i) the impure fatty acid methyl ester mixture comprises fatty acid methyl ester, methanol, and one or more of a monoglyceride, a diglyceride, and a triglyceride as impurities;
        (ii) the impure fatty acid methyl ester mixture is free from fatty acid alkyl esters with alkyl ester groups containing 2 or more carbon atoms;
        (iii) the at least one alkyl alcohol is free from methanol; and
        (iv) the reaction partially transesterifies the impure fatty acid methyl ester mixture to produce a mixture of fatty acid alkyl esters containing at least some fatty acid methyl esters and at least some fatty acid alkyl esters with alkyl ester groups containing 2 to 8 carbon atoms; and
    (b) removing methanol formed in the reaction and unreacted alkyl alcohol to produce the fatty acid ester mixture.

2. The process according to claim 1, wherein at least one alkyl alcohol is ethanol and at least one of the produced alkyl fatty acid esters is a fatty acid ethyl ester.

3. The process according to claim 1, wherein the at least one alkyl alcohol comprises a mixture of two or more alcohols at least one of which is ethanol.

4. The process according to claim 3, wherein the mixture of two or more alcohols comprises ethanol and butanol, and the reaction with the impure fatty acid methyl ester mixture further produces a fatty acid ethyl ester and a fatty acid butyl ester.

5. The process of claim 1, wherein the reaction is performed at a temperature between about 50 and 200° C. and a pressure between about 0.5 and 20 atmospheres in the presence of catalyst to produce the mixture of the fatty acid alkyl esters containing at least some fatty acid methyl esters and at least some fatty acid alkyl esters with alkyl ester groups containing 2 to 8 carbon atoms; and wherein the process further comprises separating the esters from the catalyst.

6. The process of claim 5, wherein the mixture of fatty acid alkyl esters comprises methyl palmitate, methyl stearate, methyl oleate, methyl linoleate and methyl linolenate.

7. The process of claim 5, wherein the alkyl alcohol is selected from the group consisting of ethanol, n-propanol, n-butanol, iso-amyl alcohol and mixtures thereof.

8. The process of claim 1, wherein the process is a continuous process for producing the mixture of fatty acid alkyl ester, and the process further comprises:
    (a) countercurrently transesterifying the fatty acid methyl ester at a temperature between about 50 and 200° C. and a pressure between about 0.5 and 20 atmospheres with the at least one alkyl alcohol having 2 to 8 carbon atoms in the presence of a solid acid catalyst in a reactive zone in a distillation column to produce the mixture of fatty acid alkyl esters; and
    (b) removing the produced mixture of fatty acid alkyl esters at the bottom of the column and the alcohol from the top of the column.

9. The process according to claim 8, wherein the reactive distillation column comprises:
    (a) the reactive zone containing the solid acid catalyst;
    (b) a fatty acid ester inlet above the catalyst;
    (c) an alcohol inlet below the catalyst;
    (d) product outlet at the bottom of the column for separating the produced fatty acid alkyl ester; and
    (e) an outlet at the top of the column for methanol formed in the reaction and at least one alcohol which is unreacted.

10. The process according to claim 8, wherein the solid catalyst is a heterogeneous solid acid catalyst mounted in structured packing elements and supported as a single unit of the structured packing elements.

11. The process according to claim 8, wherein the monoglyceride, diglyceride, and triglyceride of the impurities are transesterified in the reaction with the alkyl alcohol having 2 to 8 carbon atoms producing mixed fatty acid alkyl esters to be removed at the bottom of the column, along with glycerol.

12. The process according to claim 8, wherein the fatty acid methyl ester is generated from a preliminary transesterification reaction of a vegetable oil as a triglyceride with methanol.

13. The process according to claim 12, wherein the preliminary transesterification reaction of the vegetable oil as the triglyceride with methanol takes place in a biodiesel production plant and the reactive distillation column is added onto the biodiesel production plant to receive the fatty acid methyl ester product stream.

14. The process according to claim 8, wherein the fatty acid alkyl ester produced is in admixture with the fatty acid methyl ester.

15. The process according to claim 8, wherein the alkyl alcohol is ethanol and the fatty acid alkyl ester is a fatty acid ethyl ester.

16. The process according to claim 8, wherein the alkyl alcohol is a mixture of alcohols having 2 to 8 carbon atoms.

17. The process according to claim 16, wherein the alkyl alcohol mixture contains ethanol and butanol and the fatty acid alkyl ester produced comprises a mixture of a fatty acid ethyl ester and a fatty acid butyl ester.

18. The process according to claim 8, wherein the alkyl alcohol is selected from the group consisting of ethanol, propanol, isopropanol, butanol, isobutanol, amyl and isoamyl alcohol and mixtures thereof.

19. The process according to claim 8, wherein the produced fatty acid alkyl ester has a cloud point lower in temperature than the methyl fatty acid ester.

20. The process according to claim 8, wherein the produced fatty acid alkyl ester is in addition blended with a petroleum diesel fuel.

21. The process according to claim 20, wherein the petroleum diesel fuel is 50 to 95% of the blend.

22. The process according to claim 8, wherein the fatty acid methyl ester is selected from the group consisting of methyl palmitate, methyl stearate, methyl oleate, methyl linoleate, methyl linolenate, and mixtures thereof.

23. The process according to claim 22, wherein the produced fatty acid alkyl ester is derived from acids selected from the group consisting of stearic acid, oleic acid, linoleic acid, linolenic acid, and mixtures thereof.

24. The process according to claim 1, wherein the produced mixture of fatty acid alkyl esters has a fatty acid methyl ester concentration less than about 34%.

25. The process according to claim 24, wherein the produced mixture of fatty acid alkyl esters has a fatty acid methyl ester concentration of between about 3-34%.

26. The process according to claim 25, wherein the produced mixture of fatty acid alkyl esters has a fatty acid methyl ester concentration of between about 3-6%.

27. The process according to claim 1, wherein the produced mixture of fatty acid alkyl esters has a cloud point of about 5-14° C. less than that of a corresponding mixture of fatty acid methyl esters alone.

28. The process according to claim 1, wherein the produced mixture of fatty acid alkyl esters has a cloud point ranging between about −5° C. to −12° C.

29. The process according to claim 1, wherein the reaction converts about 44% or more of the fatty acid methyl ester in the impure fatty acid methyl ester mixture to a fatty acid alkyl ester with an alkyl group containing 2 to 8 carbon atoms.

30. The process according to claim 29, wherein the reaction converts about 80% or more of the fatty acid methyl ester in the impure fatty acid methyl ester mixture to a fatty acid alkyl ester with an alkyl group containing 2 to 8 carbon atoms.

31. The process according to claim 1, wherein the produced fatty acid alkyl esters include alkyl ester products of a transesterification reaction of the monoglyceride, diglyceride, and triglyceride with the alkyl alcohol.

32. The process according to claim 1, wherein the impure fatty acid methyl ester mixture is free from glycerol.

33. The process according to claim 25, wherein the produced mixture of fatty acid alkyl esters has a fatty acid alkyl ester concentration of between about 47-94% for the alkyl ester groups containing 2 to 8 carbon atoms.

\* \* \* \* \*